US012769059B2

(12) United States Patent
Karlsen et al.

(10) Patent No.: US 12,769,059 B2
(45) Date of Patent: Oct. 20, 2026

(54) ACOUSTICALLY CONTROLLED LASER SYSTEM

(71) Applicant: nLIGHT, Inc., Camas, WA (US)

(72) Inventors: Scott R. Karlsen, Battle Ground, WA (US); Dahv A.V. Kliner, Portland, OR (US)

(73) Assignee: nLIGHT, Inc., Camas, WA (US)

( * ) Notice: Subject to any disclaimer, the term of this patent is extended or adjusted under 35 U.S.C. 154(b) by 281 days.

(21) Appl. No.: 18/693,482

(22) PCT Filed: Aug. 31, 2022

(86) PCT No.: PCT/US2022/042249
§ 371 (c)(1),
(2) Date: Mar. 19, 2024

(87) PCT Pub. No.: WO2023/048920
PCT Pub. Date: Mar. 30, 2023

(65) Prior Publication Data
US 2025/0138242 A1 May 1, 2025

Related U.S. Application Data

(60) Provisional application No. 63/246,650, filed on Sep. 21, 2021.

(51) Int. Cl.
*G02B 6/26* (2006.01)
*G02F 1/11* (2006.01)
(Continued)

(52) U.S. Cl.
CPC ................ *G02B 6/262* (2013.01); *G02F 1/11* (2013.01); *G02F 1/335* (2013.01); *G02F 1/125* (2013.01)

(58) Field of Classification Search
CPC . G02F 1/11; G02F 1/125; G02F 1/335; G02B 2/262
See application file for complete search history.

(56) References Cited

U.S. PATENT DOCUMENTS 4,086,484 A 4/1978 Steensma
4,729,622 A * 3/1988 Pavlath .................. G02B 6/105 385/11

(Continued)

FOREIGN PATENT DOCUMENTS

EP 0 082 623 B1 8/1986
GB 2 180 950 A 4/1987

(Continued)

OTHER PUBLICATIONS

International Search Report dated Dec. 26, 2022, for International Patent Application No. PCT/US2022/042249.

(Continued)

*Primary Examiner* — Daniel Petkovsek
(74) *Attorney, Agent, or Firm* — Wiley Rein LLP

(57) ABSTRACT

An imaging optic includes a first end to receive laser light, an exterior, and a second end; an acoustic transmitter acoustically coupled to a first side of the exterior of the imaging optic; an acoustic absorber acoustically coupled to a second opposite side of the exterior of the imaging optic; a waveguide having a first end to receive an output from the second end of the imaging optic, a first core section, a second section, and a second end, wherein acoustic waves output from the acoustic transmitter are arranged to diffract a first order light from the laser light in the imaging optic; wherein the first order light is selectively output from the second end of the imaging optic into one of the sections of the waveguide.

20 Claims, 7 Drawing Sheets

400

(51) Int. Cl.
*G02F 1/335* (2006.01)
*G02F 1/125* (2006.01)

(56) References Cited

U.S. PATENT DOCUMENTS

| | | | | |
|---|---|---|---|---|
| 9,250,390 | B2 * | 2/2016 | Muendel | G02B 6/4216 |
| 2013/0343412 | A1 | 12/2013 | Gao | |
| 2015/0003487 | A1 | 1/2015 | Gao | |
| 2017/0003461 | A1 | 1/2017 | Tayebati et al. | |
| 2018/0088343 | A1 * | 3/2018 | Kliner | B23K 26/034 |
| 2020/0319408 | A9 | 10/2020 | Gross et al. | |
| 2021/0286200 | A1 | 9/2021 | Gross et al. | |

FOREIGN PATENT DOCUMENTS

| | | | |
|---|---|---|---|
| GB | 2 269 237 | A | 2/1994 |
| KR | 100891743 | B1 | 4/2009 |
| KR | 20210005954 | A | 1/2021 |

OTHER PUBLICATIONS

Written Opinion of International Searching Authority dated Dec. 26, 2022, for International Patent Application No. PCT/US2022/042249.

Supplementary European Search Report issued in corresponding EP Application No. 22873405.9 dated Jul. 2, 2025, 9 pages.

Abdulhalim et al, "All-Fiber and Fiber Compatible Acousto-optic Modulators with Potential Biomedical Applications", Optical Fibers and Sensors for Medical Diagnostics and Treatment Applications VI, vol. 6083, dated Feb. 9, 2006, 15 pages.

* cited by examiner

100

200

400

500

ACOUSTICALLY CONTROLLED LASER SYSTEM

CROSS-REFERENCE TO RELATED APPLICATION(S)

This is a National Stage Entry into the United States Patent and Trademark Office from International Patent Application No. PCT/US2022/042249, filed on Aug. 31, 2022, which relies on and claims priority to U.S. Patent Application No. 63/246,650, filed on Sep. 21, 2021, the entire contents of both of which are incorporated herein by reference.

FIELD OF THE INVENTION

The present disclosure relates to the field of lasers, and more particularly to systems including to receive a signal from a laser source.

BACKGROUND OF THE INVENTION

Fiber lasers are widely used in industrial processes (e.g., cutting, welding, cladding, heat treatment, etc.) In some fiber lasers, the optical gain medium includes one or more active optical fibers with cores doped with rare-earth element(s). The rare-earth element(s) may be optically excited ("pumped") with light from one or more semiconductor laser sources. There is great demand for high power and high efficiency diode lasers, the former for power scaling and price reduction (measured in $/Watt) and the latter for reduced energy consumption and extended lifetime.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology.

DETAILED DESCRIPTION OF EMBODIMENT(S) OF THE INVENTION

Figure 1:
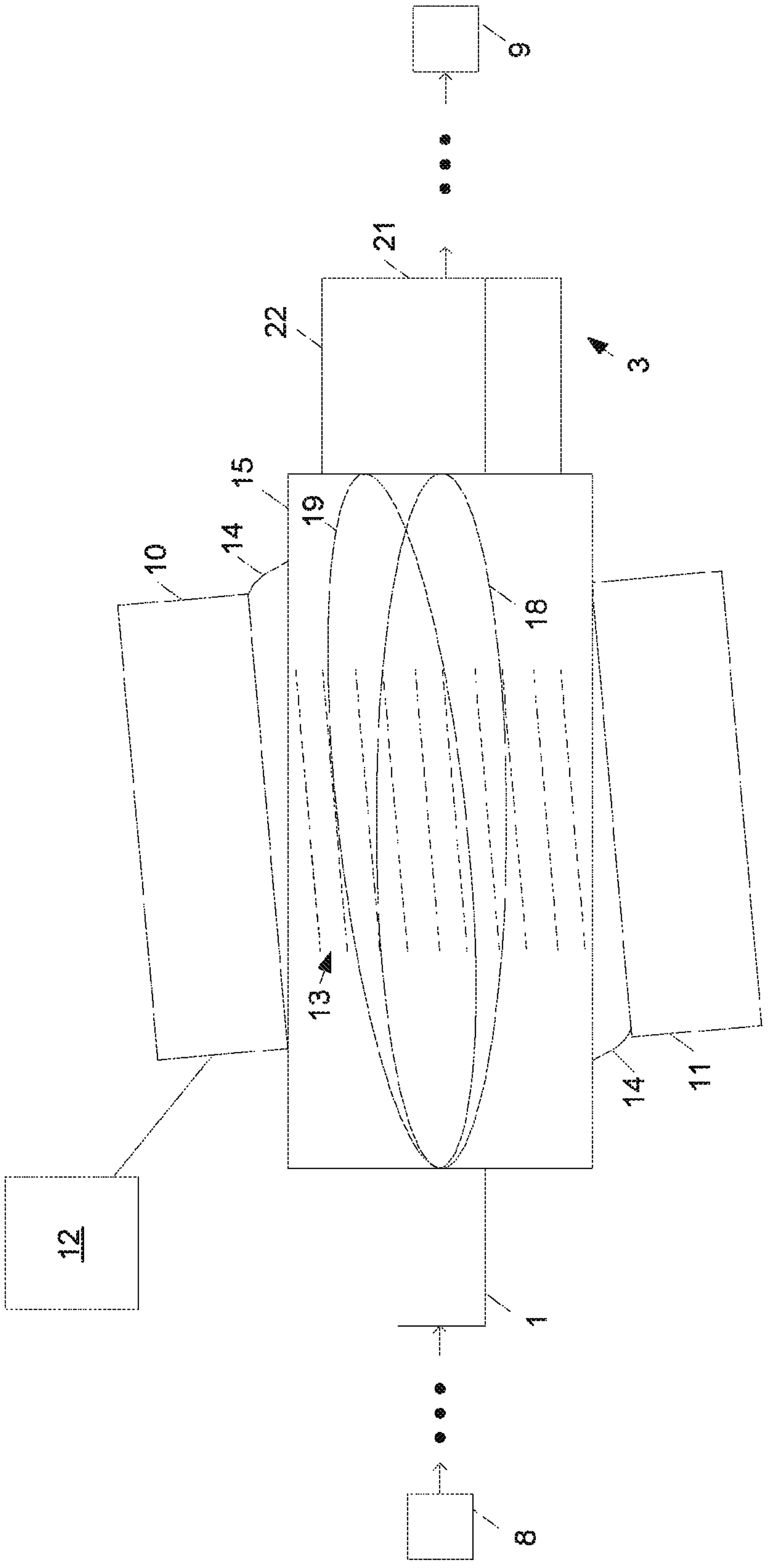
FIG. 1 illustrates a schematic diagram of an acoustically controlled laser system.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items. The systems, apparatus, and methods described herein should not be construed as limiting in any way. Instead, the present disclosure is directed toward all novel and non-obvious features and aspects of the various disclosed embodiments, alone and in various combinations and sub-combinations with one another. The term "or" refers to "and/or," not "exclusive or" (unless specifically indicated).

The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation. Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus.

Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art. In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples are described with reference to directions indicated as "above," "below," "upper," "lower," and the like. These terms are used for convenient description, but do not imply any particular spatial orientation.

U.S. Patent Publication No. 2020/0319408, which is incorporated by reference herein, describes an embodiment in which a perturbation device adjusts one or more characteristics of a laser beam by bending an optical fiber. However, bending an optical fiber with a motor may be too slow for applications where the laser beam is scanned, such as some additive manufacturing applications. Specifically, the motor may be limited to adjusting the laser beam characteristics at rates of about 1 kHz. Various embodiments described herein may switch beam parameters at faster rates, such as 1 MHz.

Also, some embodiments described in the '408 publication may be directed to a continuous motion of the laser beam across the face of a length of fiber. A "imaging optic" is defined herein to be a waveguide (e.g., a fiber or some other GRIN waveguide with cladding), a GRIN lens (e.g., no cladding), or one or more free space lenses. If the imaging optic is a waveguide or GRIN lens it may possess a higher-index region (core region) surrounded by a lower-index region (cladding region). The refractive index (RIP) of a imaging optic may include a higher-index region (core region) surrounded by a lower-index region (cladding region), wherein light is guided in the higher-index regions.

Each confinement region and each cladding region can have any RIP, including but not limited to step-index and graded-index. The confinement region may be a variety of shapes such as circular, annular, polygonal, arcuate, elliptical, irregular, or the like, or any combination thereof. A confinement region may be of uniform thickness about a central axis in the longitudinal direction, or the thicknesses may vary about the central axis in the longitudinal direction.

In various embodiments in which the imaging optic include lens(s) (such as free space lenses), the imaging optic may include a collimating lens with a section of glass to operate as an acousto-optic deflector, followed by a focusing lens. In one example, curved lens surfaces may be fabricated on the ends of the acousto-optic deflector. Both ends of the acousto-optic deflector may be glass-to-air interfaces. In some embodiments, the imaging optic (or any component thereof) may have a cladding around it to prevent stray light from heating the acoustic components.

In the embodiments described in the '408 application that utilize a continuous motion of the laser beam across the face of a imaging optic, to get light into a core and a surrounding section at the same time, some light must enter the area with low refractive index, which increases the numerical aperture (NA) of light exiting the imaging optic. Various embodiments described herein may allow a laser beam to be split and light can enter two different guiding regions at the same time.

Fast optical switching or beam steering technology is generally limited to electro-optics, magneto-optics or acousto-optics. Electro-optics and magneto-optics need materials with a high electro-optic coefficient, and those materials may have absorption coefficients that are too high for some lasers, such as multi-kilowatt class lasers. Acousto-optics frequently use fused silica, the same material in the waveguide or lens. Some embodiments described herein include an acousto-optic beam deflector inside a waveguide or lens, to deflect light from the core and into other guiding regions. The acousto-optic deflector may be inside the waveguide or lens to avoid problems with contamination frequently found in industrial laser settings.

Various embodiments described herein may include an input waveguide, a imaging optic, and an output waveguide. Instead of bending the imaging optic, an acoustic transmitter (e.g., a piezo transducer or other acoustic transducer) is placed near the middle of the imaging optic. The acoustic waves travel across the width of the imaging optic, and get absorbed into an acoustically impedance matched absorber.

To provide an acousto-optic deflector that has high efficiency in deflecting the input beam to a new direction, the input beam may hit the acoustic waves at a slight angle. This incidence angle (also called the Bragg angle) may be in the range of 0.1 to 4°. Various embodiments may transmit the acoustic waves along an axis that is tilted relative to an optical axis of the imaging optic.

In one embodiment, an angled notch may be machined into the side of the imaging optic, and the acoustic transmitter may be located in the notch. The interaction length (approximately the width of the acoustic waves) may be in the range of 0.5 to 10 mm.

In another embodiment, two individual imaging optics that have been cleaved at an angle may be spliced back together to form a bend. The acoustic transmitter may be placed at the bend and the acoustic waves may deflect light out of the $0^{th}$ order and into the $1^{st}$ diffraction order. An output waveguide with a first core section and a second section may be spliced to the imaging optic such that the $0^{th}$ order light is directed to one of the sections, and the $1^{st}$ order light is directed to the other one of the sections. In another embodiment, a monolithic imaging optic may be bent near the acoustic transmitter, instead of splicing it together at an angle. Since many kilowatts of optical power may be transmitted in various embodiments, the light in the $0^{th}$ order and other orders is directed to a safe location, for example, all light may enter the output waveguide.

The acousto-optic deflector may change the beam direction by creating a transmission grating in the glass, and causing the beam to diffract. Pressure from the acoustic waves may change the refractive index, so there are periodic regions of lower and higher refractive index. The deflection angle can be changed by changing the frequency of the acoustic waves. And the diffraction efficiency (how much light is diffracted out of the input beam) can be changed by changing the power of the acoustic transmitter. This causes higher pressure sound waves and changes the refractive index of the glass more. This enables either scanning the beam between the first core section and the second section like various embodiments described in the '408 publication, or splitting the beam between the first core section and the second section. If the beam is split, then all light may enter the first core section and the second section. Alternatively, if the beam is not split, then the beam could be very quickly dithered back and forth between the first core section and the second section to split the power over time.

FIG. 1 illustrates a schematic diagram of an acoustically controlled laser system 100. The system 100 includes an input optical fiber 1 to output an input laser beam (e.g., generated by a laser source, which may be any laser source 8 now known or later developed, or from one or more laser system component(s), now known or later developed, that receive an output from the laser source 8) to a graded-index optical fiber 15, which outputs laser beam 18 and laser beam 19 into a first core section 21 and a second section 22, respectively, of optical fiber 3. The second section 22 may be a second core section that is co-axial with the first core section 21, in various embodiments, however, this is not required (the second section 22 may be a cladding in some embodiments). The input optical fiber 1 and the output optical fiber may be coupled to ends of the graded-index optical fiber 15 using any splicing methods now know or later developed, according to various embodiments.

An acoustic transmitter 10 generates acoustic waves 13 that may hit the input laser beam at a slight angle (the incidence angle). In various embodiments, the incidence angle may be in the range of 0.1 to 4 degrees. An acoustic absorber 11, which may be acoustically impedance matched with the graded index optical fiber 15 and/or acoustic transmitter 10, may be located on the opposite side of the graded-index optical fiber 15 to subsequently absorb the acoustic waves 13.

The acoustic waves 13 may deflect light out of a $0^{th}$ order of the input laser beam and into a $1^{st}$ diffraction order-generating the $0^{th}$ order diffraction laser beam 18 and $1^{st}$ order laser beam 19. A control circuitry 12 may generate a control signal based on an input signal, e.g., an input from a person or an input from a system (not shown), to generate the acoustic waves 13 having selected parameters. The control circuitry 12, the acoustic transmitter 10, and the acoustic absorber 11 may be any control circuitry, acoustic transmitter (e.g., piezo transducer or other acoustic transducer), or acoustic absorber, now known or later developed.

In some examples, the parameters may include a power and a frequency of the acoustic waves 13. Varying the frequency of the acoustic waves 13 may change the deflection angle. Changing the deflection angle may enable scanning the beam 19 between the first core section 21 and the second section 22. In one embodiment, the beam 19 may be very quickly (e.g., at 1 MHz) dithered back and forth between the first core section 21 and the second section 22 to split the power over time. Diffraction efficiency (how much light is refracted out of the input beam) may be changed by changing the power (increasing power causes higher pressure sound waves and changes the refractive index of a material (e.g., glass) of the graded-index optical fiber 15. The length of the graded-index optical fiber 15 is ½ pitch in this example, but may be any integer multiple of ½ pitch in other examples. The laser beam 18 or 19 may be output from the optical fiber 3 to a process head 9 (or some other laser component(s), now known or later developed, that deliver beam 18 or 19 to a workpiece), and the very quick (e.g., at 1 MHz) dithering back and forth as described above may enable very quick (e.g., at 1 MHz) variation of the beam profile of beam 18 or 19 at the work piece and/or varying the frequency to split power over time in order to tune and/or optimize the process similar to any way described in the '408 application, or in any other way that tunes and/or optimizes a process as desired depending on applications.

In various embodiments, the acoustic transmitter 10 and the acoustic absorber may have a side (e.g., a planar side) coupled to the graded-index optical fiber 15 via an acoustic interface material 14. In some embodiments, the graded-index optical fiber 15 may be faceted, (e.g., may have plural sides such as four planar sides in the case of a rectangular optical fiber), and the side of the acoustic transmitter 10 and the acoustic absorber 11 may be attached to different ones of the plural sides (e.g., opposite sides). However, a faceted graded-index optical fiber 15 is not required—it may be possible and practical to have a cylindrically shaped optical fiber in various embodiments.

The acoustic interface material 14 may be acoustically impedance matched with a material of the graded-index optical fiber 15 in various embodiments. In some examples, they may be the same material (e.g., silica), but this is not required. In other examples, the materials may be different but may have the same or similar coefficients of thermal expansion. The acoustic interface material 14 may be in the form of a wedge, as illustrated, which causes the acoustic transmitter 10 and the acoustic absorber 11 to be mounted on the graded-index optical fiber 15 at an angle. The wedge may be created by collapsing a cone shaped ferrule onto the side of the graded-index optical fiber 15. The acoustic interface material 14 may place the acoustic waves 13 at an angle relative to optic waves of the input laser beam, and may be arranged to efficiently couple the acoustic waves 13 into the graded-index optical fiber 15 (i.e. optimized for minimizing reflection of the acoustic wave 13 from side to side in the graded-index optical fiber 15).

In various embodiments, any type of waveguide may be used in place of any input fiber or output fiber described herein. Also, any imaging optic described herein may be used in place of the graded-index optical fiber 15 or any other optical fiber with a confinement region described herein.

Figure 2A:
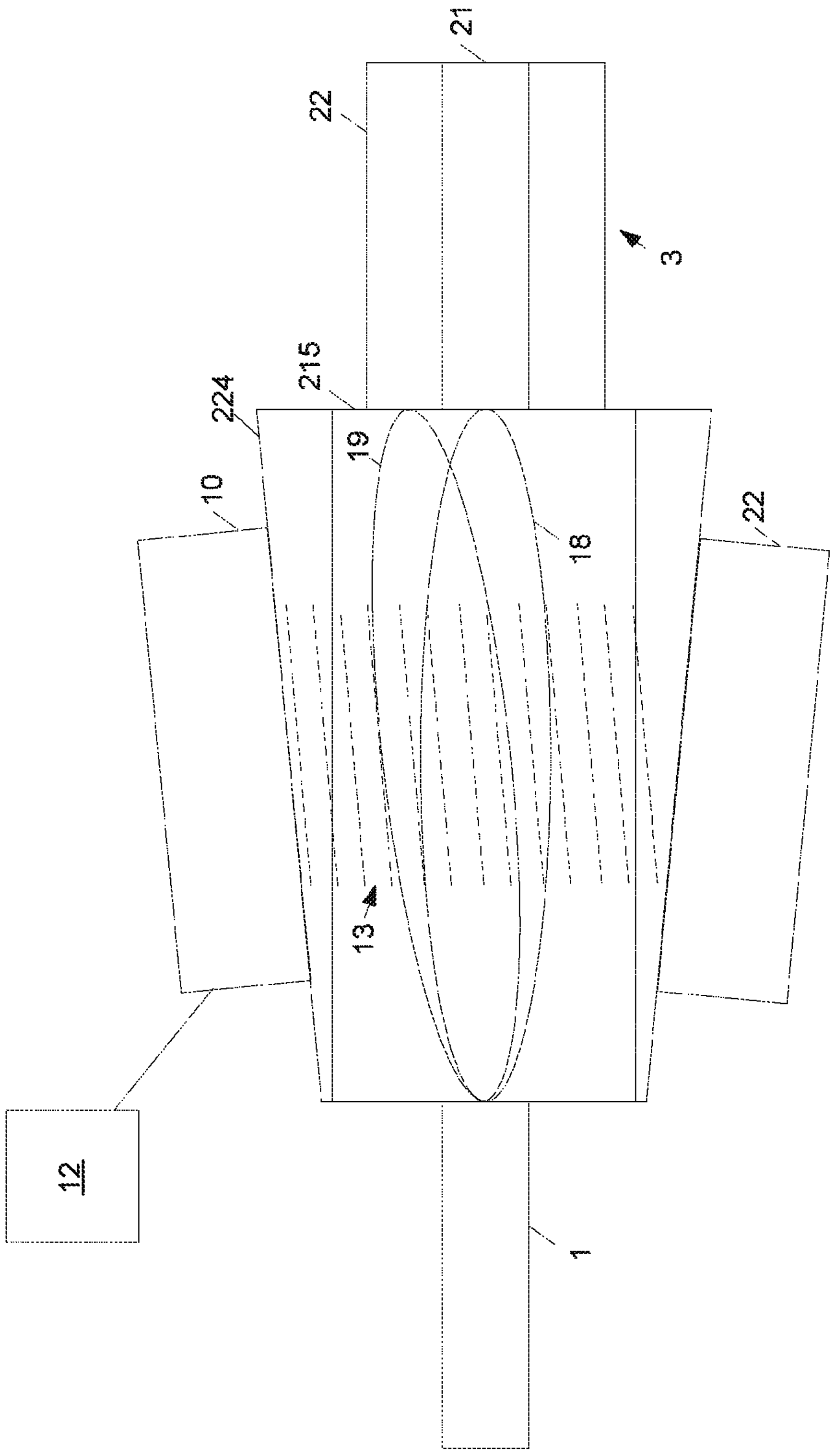
FIG. 2A illustrates a schematic diagram of an acoustically controlled laser system including a sleeve, according to various embodiments.
Figure 2B:
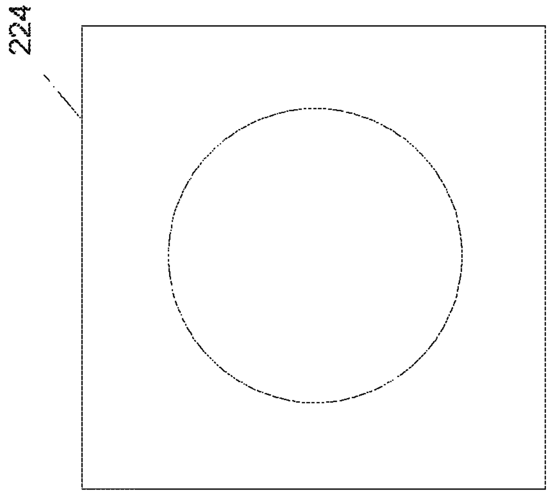
FIG. 2B illustrates a front end view of the sleeve from FIG. 2A.

FIG. 2A illustrates a schematic diagram of an acoustically controlled laser system 200 including a sleeve 224, according to various embodiments. FIG. 2B illustrates a front end view of the sleeve 224 from FIG. 2. The graded-index optical fiber 215 may be cylindrically shaped, but may be similar to the graded-index optical fiber 15 (FIG. 1) in any other respect. The sleeve 224 may have a cylindrically shaped opening to fit over the exterior of the graded-index optical fiber 215. The outer surface of the sleeve 224 may be faceted (e.g., have four sides as indicated by FIG. 2B).

The planar sides may taper from one end to the other as shown in FIG. 2A. This may allow the acoustic transmitter 10 and the acoustic absorber 11 to be mounted to the graded-index optical fiber 215 at an angle similar to the angle of the embodiment of FIG. 1. The acoustic transmitter 10 and the acoustic absorber 11 may be attached to the graded-index optical fiber 215 using an adhesive or by splicing methods. The laser system 200 may include a laser source (not shown, similar to the laser source 8, FIG. 1) and a process head (not shown, similar to the laser source 9, FIG. 1) and in any applications that laser system 100 may be utilized in.

Figure 3:
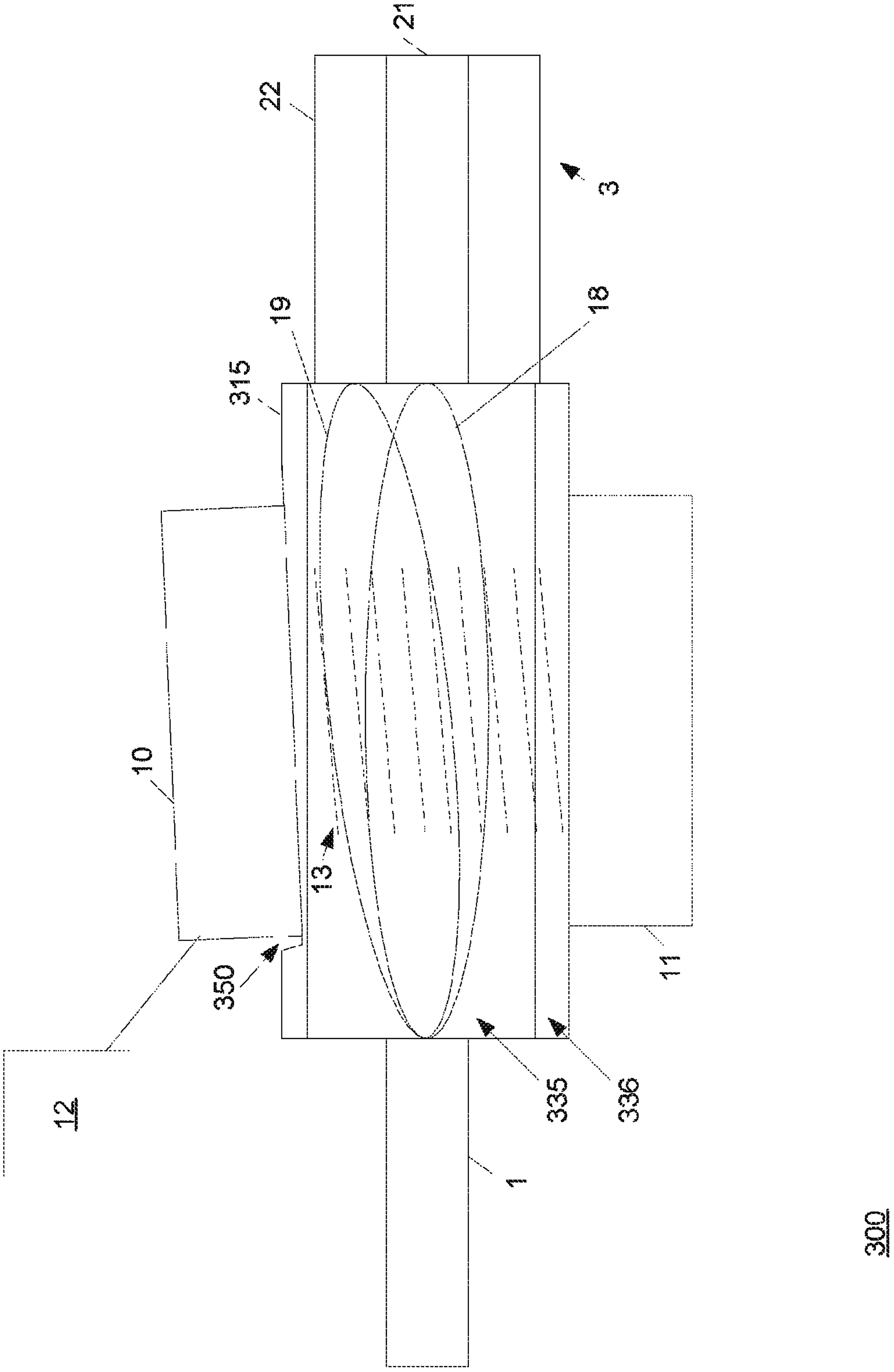
FIG. 3 illustrates a schematic diagram of an acoustically controlled laser system with a notched optical fiber, according to various embodiments.

FIG. 3 illustrates a schematic diagram of an acoustically controlled laser system 300 with a notched graded-index optical fiber 315, according to various embodiments. The graded-index optical fiber 315 may be similar to the graded-index optical fiber 15 (FIG. 1) in any respect, but machined on the top side to form the notch 350. The notch 350 may have a sloped bottom with a depth that tapers from one end to the other, as illustrated (e.g., sloped with respect to the fiber axis). This may allow the acoustic transmitter 10 and the acoustic absorber 11 to be mounted to the graded-index optical fiber 315 at an angle similar to the angle of the embodiment of FIG. 1. The acoustic transmitter 10 and the acoustic absorber 11 may be attached to the graded-index optical fiber 315 using an adhesive or by splicing methods. The laser system 300 may include a laser source (not shown, similar to the laser source 8, FIG. 1) and a process head (not shown, similar to the laser source 9, FIG. 1) and in any applications that laser system 100 may be utilized in.

Figure 4:
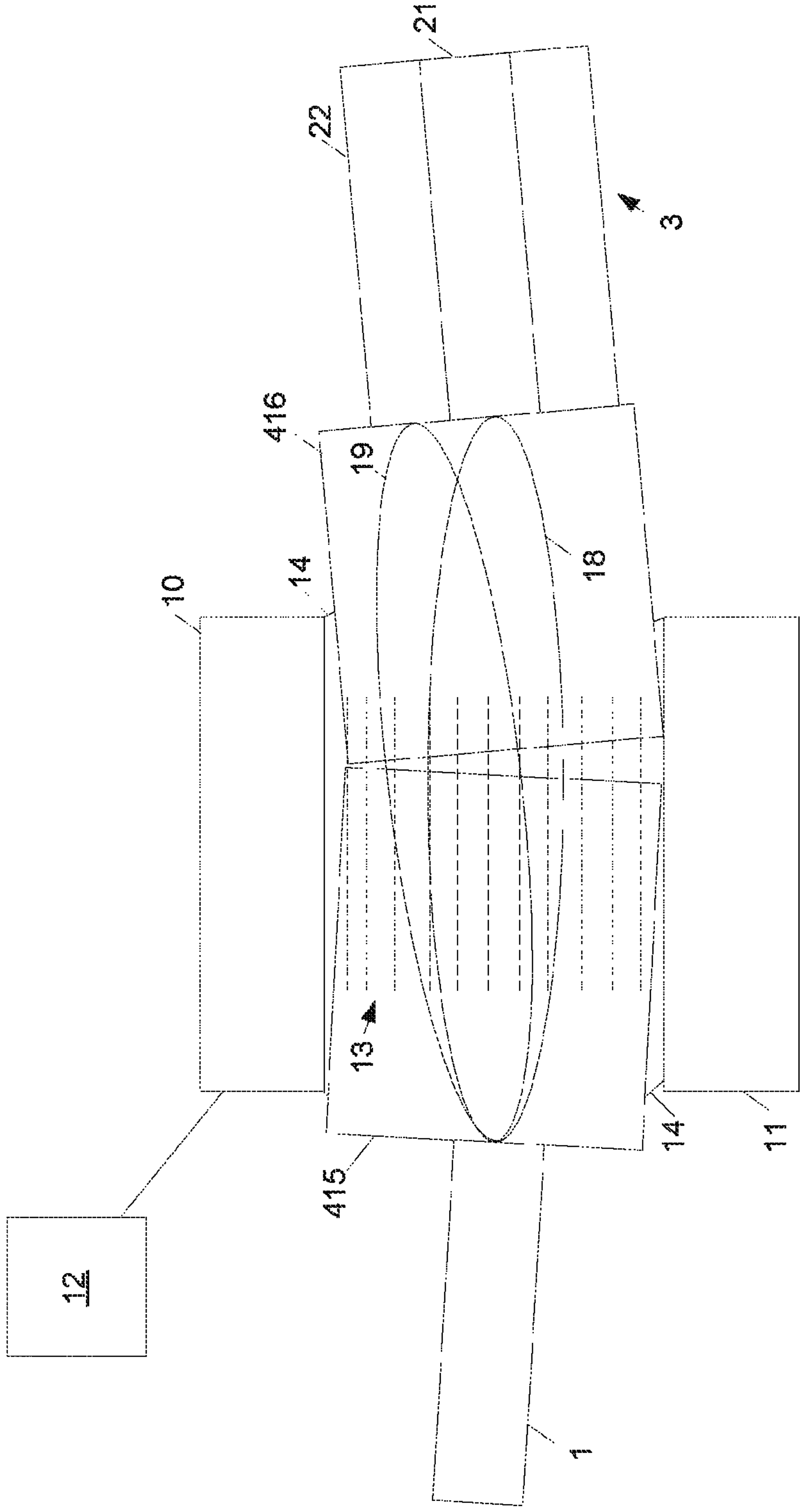
FIG. 4 illustrates a schematic diagram of an acoustically controlled laser system having individual optical fibers spliced together, according to various embodiments.

FIG. 4 illustrates a schematic diagram of an acoustically controlled laser system 400 having individual graded-index optical fibers 415 and 416 spliced together, according to various embodiments. Each graded-index optical fibers 415 and 416 may otherwise be similar to the graded-index optical fiber 15 (FIG. 1). An end face of the graded-index optical fiber 415 may be spliced to an end face of the optical fiber 416 at an angle. This may arrange the acoustic waves 13 at the same angle with respect to an input beam at a similar angle as described with respect to FIG. 1 (e.g., at an angle with respect to a fiber axis or optical axis of the graded-index optical fiber 415). An acoustic interface material 14, similar to any other acoustic interface material described herein, may be used to acoustically couple the acoustic transmitter 10 and the acoustic absorber 11 to the graded-index optical fibers 415 and 416. The laser system 400 may include a laser source (not shown, similar to the laser source 8, FIG. 1) and a process head (not shown, similar to the laser source 9, FIG. 1) and in any applications that laser system 100 may be utilized in.

Figure 5:
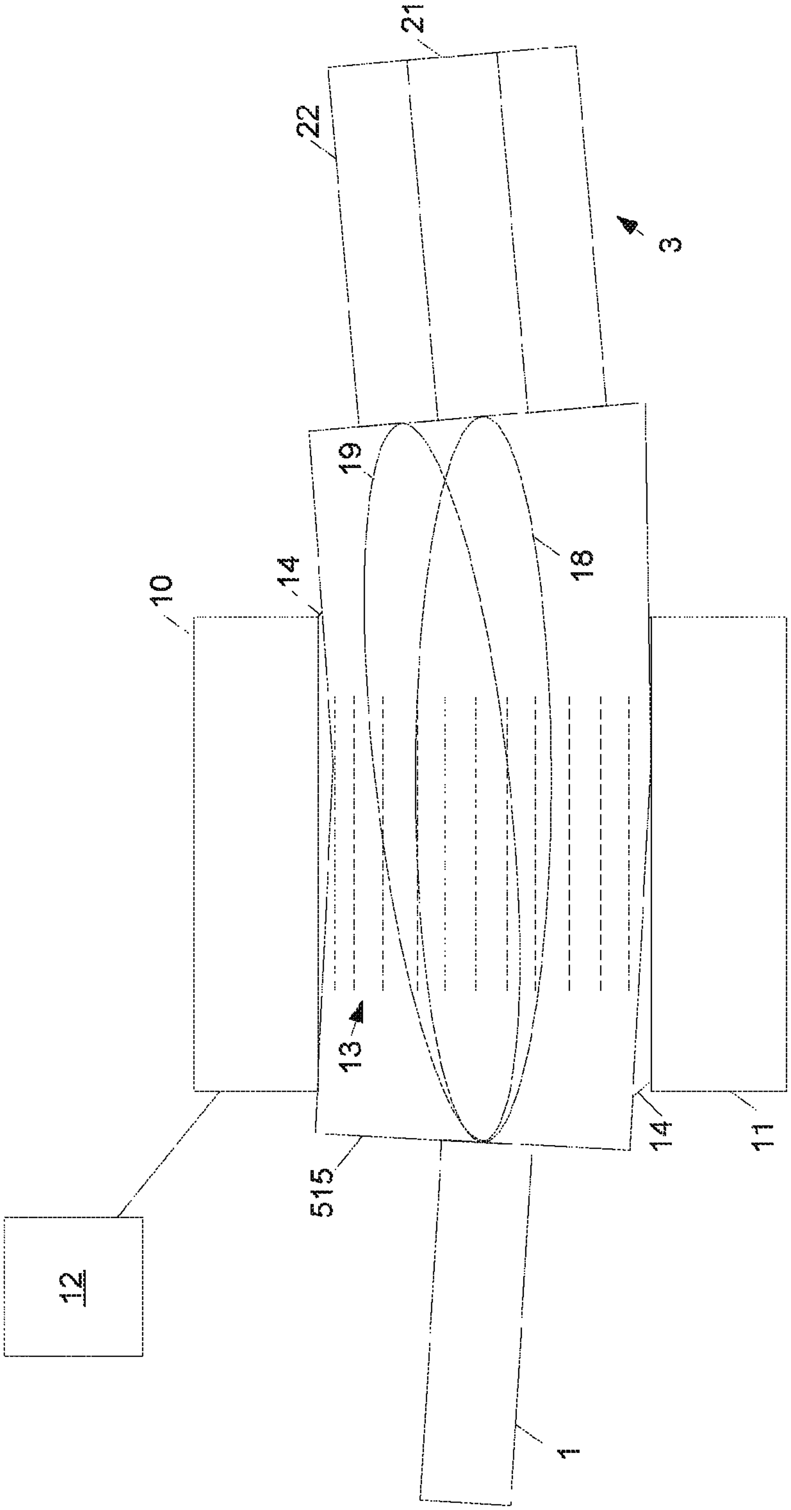
FIG. 5 illustrates a schematic diagram of an acoustically controlled laser system including an optical fiber having more than one optical axis, according to various embodiments.

FIG. 5 illustrates a schematic diagram of an acoustically controlled laser system 500 including a graded-index optical fiber 515 having more than one optical axis, according to various embodiments. The graded-index optical fiber 515 may be bent so that it has two non-parallel optical axes, similar to the embodiment described with respect to FIG. 4. The graded-index optical fiber 515 may be similar in any other respect to the graded-index optical fiber 215 (FIG. 1). This may arrange the acoustic waves 13 at the same angle with respect to an input beam at a similar angle as described with respect to FIG. 1 (e.g., at an angle with respect to a fiber axis or optical axis of an input side of the graded-index optical fiber 515). In various embodiments, the graded-index optical fiber 515 may be a fixably bent optical fiber. An acoustic interface material 14 may be used to acoustically couple the acoustic transmitter 10 and the acoustic absorber 11 to the graded-index optical fiber 515. The laser system 500 may include a laser source (not shown, similar to the laser source 8, FIG. 1) and a process head (not shown, similar to the laser source 9, FIG. 1) and in any applications that laser system 100 may be utilized in.

Figure 6:
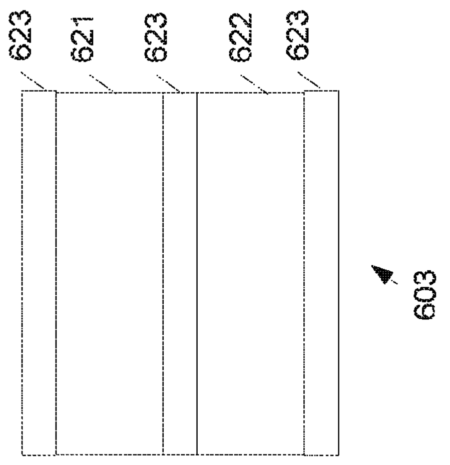
FIG. 6 illustrates a schematic diagram of a plural core optical fiber to receive the optical beams, according to various embodiments.

FIG. 6 illustrates a schematic diagram of a plural core optical fiber 603 to receive the optical beams 18 and 19 (FIG. 1), according to various embodiments. The plural core optical fiber 603 has non-coaxial cores 621 and 622. A cladding 623 may be located between the non-coaxial cores 621 and 622 and/or around the coaxial cores 621 and 622 in various embodiments. The plural core optical fiber 603 may be used as an output fiber for any of the embodiments described herein. In such a case, the optical beam 18 (FIG. 1) may input into the core 621 and the optical beam 19 (FIG. 1) may be selectively input into the core 622.

Although the illustrated plural core optical fiber 603 has two cores, in other embodiments it may be possible or practical to utilize a greater number of cores.

In various embodiments, any type of waveguide may be used in place of any input fiber or output fiber described herein. Also, any imaging optic described herein may be used in place of any optical fiber with a confinement region described herein.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

The invention claimed is:

1. An apparatus, comprising:
- an imaging optic having a first end to receive laser light, an exterior, and a second end;
- an acoustic transmitter acoustically coupled to a first side of the exterior of the imaging optic;
- an acoustic absorber acoustically coupled to a second opposite side of the exterior of the imaging optic;
- a waveguide having a first end to receive an output from the second end of the imaging optic, a first core section, a second section, and a second end; and
- control circuitry coupled to the acoustic transmitter,
- wherein acoustic waves output from the acoustic transmitter are arranged to diffract a first order light from the laser light in the imaging optic;
- wherein the first order light is selectively output from the second end of the imaging optic into one of the sections of the waveguide and a remaining zero order light into the other one of the sections of the waveguide,
- wherein the control circuitry selects an acoustic power of the acoustic waves to regulate how much power is diffracted out of the laser light or selects an acoustic frequency of the acoustic waves to select which section of the plurality of sections the first order light is selectively directed into,
- wherein the imaging optic comprises at least one of an optic fiber with a notch in the first side of the exterior thereof, a continuous length of optic fiber with a bend, or first and second lengths of optic fiber spliced together to form a bend.

2. The apparatus of claim 1, wherein the imaging optic includes a round graded-index section.

3. The apparatus of claim 2, wherein at least part of the acoustic transmitter is located in the notch.

4. The apparatus of claim 2, wherein the notch partially penetrates a cladding that surrounds the round graded-index section.

5. The apparatus of claim 2, further comprising:
- a cladding surrounding the round graded-index section, wherein an exterior surface of the cladding is faceted, and wherein the notch is defined by a facet that corresponds to the first side of the exterior of the imaging optic.

6. The apparatus of claim 1, further comprising:
- an acoustic interface material on at least the first and second sides of the imaging optic,
- wherein the acoustic interface material acoustically couples the acoustic transmitter and the acoustic absorber to the exterior of the imaging optic.

7. The apparatus of claim 6, wherein the acoustic interface material comprises a same material as a material of the imaging optic.

8. The apparatus of claim 1, further comprising:
- a sleeve around the exterior of the imaging optic,
- wherein the sleeve acoustically couples the acoustic transmitter and the acoustic absorber to the exterior of the imaging optic.

9. The apparatus of claim 8, wherein the imaging optic is cylindrically shaped, and wherein an interior of the sleeve is round and an exterior of the sleeve is faceted.

10. The apparatus of claim 1, wherein a bottom of the notch is sloped, and wherein a lateral side of the acoustic transmitter is located on the sloped bottom.

11. The apparatus of claim 1, wherein a fiber axis or other optical axis of the first length of the imaging optic is non-parallel with a fiber axis or other optical axis of the second length of the imaging optic, and wherein the first length includes the first end of the imaging optic and the second length includes the second end of the imaging optic.

12. The apparatus of claim 1, wherein the imaging optic comprises a higher index region surrounded by a lower index region.

13. The apparatus of claim 1, wherein the second section of the waveguide surrounds the first core section.

14. The apparatus of claim 1, wherein the waveguide comprises plural non-coaxial cores, wherein the first core section comprises a first core of the plural non-coaxial cores, and wherein the second section comprises a second different core of the plural non-coaxial cores.

15. The apparatus of claim 1, wherein an incidence angle associated with the first order light is in the range of 0.1 to 4 degrees.

16. A laser system, comprising:
- a laser source to generate laser light;
- an imaging optic having a first end to receive the laser light, an exterior, and a second end;
- an acoustic transmitter acoustically coupled to a first side of the exterior of the imaging optic;
- an acoustic absorber acoustically coupled to a second opposite side of the exterior of the imaging optic;
- a waveguide having a first end to receive an output from the second end of the imaging optic, a first core section, a second section, and a second end; and
- control circuitry coupled to the acoustic transmitter,
- wherein acoustic waves output from the acoustic transmitter are arranged to diffract a first order light from the laser light in the imaging optic;
- wherein the first order light is selectively output from the second end of the imaging optic into one of the sections of the waveguide and a remaining zero order light into the other one of the sections of the waveguide, wherein the control circuitry selects an acoustic power of the acoustic waves to regulate how much power is diffracted out of the laser light or an acoustic frequency of the acoustic waves to select which section of the plurality of sections the first order light is selectively directed into, and wherein the imaging optic comprises at least one of an optic fiber with a notch in the first side of the exterior thereof, a continuous length of optic fiber with a bend, or first and second lengths of optic fiber spliced together to form a bend; and a process head to deliver the zero order light, a beam derived from the zero order light, the first order light, or a beam derived from the first order light, or combinations thereof, to a workpiece.

17. The laser system of claim 16, wherein the imaging optic includes a round graded-index section.

18. The laser system of claim 16, wherein a fiber axis or other optical axis of the first length of the imaging optic is non-parallel with a fiber axis or other optical axis of the second length of the imaging optic, and wherein the first length includes the first end of the imaging optic and the second length includes the second end of the imaging optic.

19. The laser system of claim 16, wherein the waveguide comprises plural non-coaxial cores, wherein the first core section comprises a first core of the plural non-coaxial cores, and wherein the second section comprises a second different core of the plural non-coaxial cores.

20. The laser system of claim 16, wherein an incidence angle associated with the first order light is in the range of 0.1 to 4 degrees.

* * * * *